(No Model.)
W. H. BEDELL.
HANDSAW.
No. 522,749. Patented July 10, 1894.
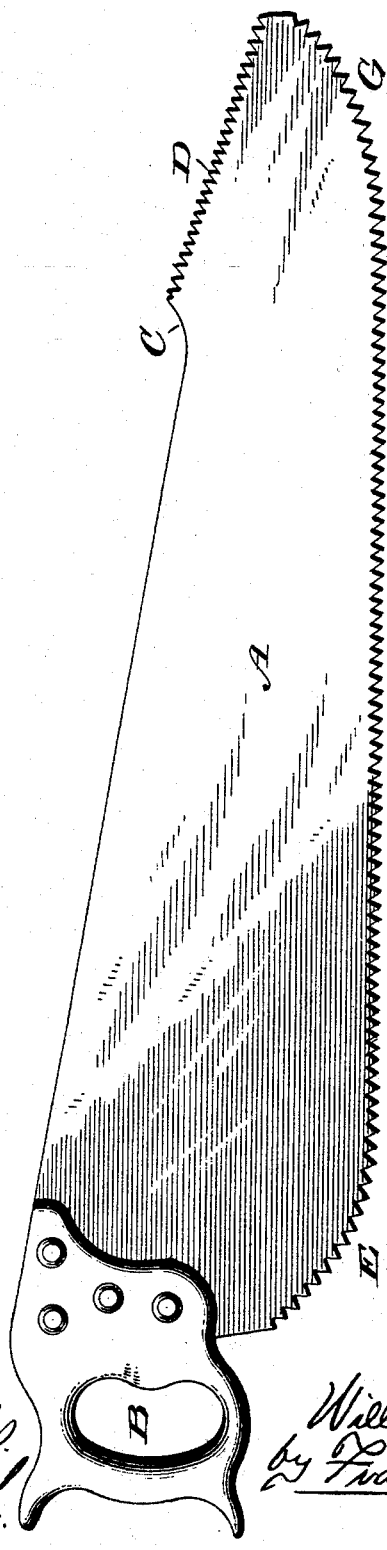
Witnesses:
L. C. Hills.
A. L. Hough.
Inventor:
William H. Bedell,
by Franklin H. Hough
attorney.
THE NORRIS PETERS CO., PHOTO-LITHO., WASHINGTON, D. C.

UNITED STATES PATENT OFFICE.

WILLIAM H. BEDELL, OF MONROE, NEW HAMPSHIRE.

HANDSAW.

SPECIFICATION forming part of Letters Patent No. 522,749, dated July 10, 1894.

Application filed March 23, 1894. Serial No. 504,822. (No model.)

*To all whom it may concern:*

Be it known that I, WILLIAM H. BEDELL, a citizen of the United States, residing at Monroe, in the county of Grafton and State of New Hampshire, have invented certain new and useful Improvements in Handsaws; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to certain new and useful improvements in hand-saws, and it has for its object to provide a saw which is specially adapted for use in sawing through floors or partition walls, without the necessity of using other tools in providing an opening for the saw-blade.

To this end and to such others as the invention may pertain, the same consists in the peculiar construction of the saw blade, whereby the result above indicated may be readily accomplished.

The invention is clearly illustrated in the accompanying drawing, which, with the letters of reference marked thereon forms a part of this specification, and in which drawing I have shown a side view of a hand-saw constructed in accordance with my invention.

Reference now being had to the drawing by letter, A designates the saw blade, and B the handle, the said handle being of the usual well known form and attached to the end of the saw-blade in the usual way. The upper edge of the saw blade is straight, from the handle of the saw to a point a few inches from the opposite end of the blade, where the edge is curved slightly upward, as shown at C, and from this point to the end of the blade the edge extends downward, at a slight angle and in a straight line, said portion of the edge being provided with cutting teeth, as shown at D. The lower edge of the blade is provided with cutting teeth the entire length of the blade, and adjacent to the point at which the blade is attached to the handle, the said lower cutting edge of the blade is provided with an abrupt curve, as shown at E, and from the outer termination of this abrupt curve, the lower edge is continued in either a straight or slightly curved line to a point near the free end of the blade, where another abrupt curve G, is provided.

It will be observed from the foregoing description that with a saw possessing the peculiarities referred to, by using the abrupt curve of the blade adjacent to the handle, the operator is enabled to readily saw through either a vertical or horizontal surface without using other tools to start the saw, as by applying the curved edge of the blade to the surface and imparting to the blade a combined reciprocating and rocking motion the work is readily accomplished.

In case the floor or wall through which it is desired to cut should be of unusual thickness, or for other reason it should be considered desirable to provide an opening for the saw of greater width than would be provided by the abrupt curve of the saw-blade, it will be readily seen that the narrow portion of the saw blade provided with teeth D, may be advantageously used after an aperture has been cut of suitable size, to permit the said end of the saw blade, to be passed therethrough.

Having thus described my invention, what I claim to be new, and desire to secure by Letters Patent, is—

A hand-saw having its lower cutting edge provided with one or more abrupt curves, as described, and having cutting teeth provided upon the upper edge of the blade, at the free end thereof, substantially as described and for the purpose specified.

In testimony whereof I affix my signature in presence of two witnesses.

WILLIAM H. BEDELL.

Witnesses:
GEORGE I. BROWN,
JOHN Q. A. LANG.